United States Patent [19]

Jordan et al.

[11] E Re. 30,147

[45] Reissued Nov. 13, 1979

[54] METHOD OF COATING A GLASS RIBBON ON A LIQUID FLOAT BATH

[75] Inventors: John F. Jordan; Curtis M. Lampkin, both of El Paso, Tex.

[73] Assignee: Photon Power, Inc., El Paso, Tex.

[21] Appl. No.: 791,737

[22] Filed: Apr. 28, 1977

Related U.S. Patent Documents

Reissue of:

[64] Patent No.: 3,880,633
Issued: Apr. 29, 1975
Appl. No.: 431,705
Filed: Jan. 8, 1974

[51] Int. Cl.[2] ..... C03B 18/00; C03C 17/10

[52] U.S. Cl. ..... 65/60 A; 65/65; 65/99 A; 65/182 R; 427/110

[58] Field of Search ..... 65/60 R, 65 A, 99 A, 65/182 R, 60 A, 60 D, 60 C; 427/110

[56] References Cited

U.S. PATENT DOCUMENTS

| | | | |
|---|---|---|---|
| Re. 25,651 | 10/1964 | Young | 427/110 |
| Re. 25,767 | 4/1965 | Auffenorde | 427/110 |
| 2,522,531 | 9/1950 | Mochel | 427/110 |
| 2,564,677 | 8/1951 | Davis | 338/308 |
| 2,614,944 | 10/1952 | Lytle | 427/110 |
| 2,651,585 | 9/1953 | Lytle et al. | 427/110 |
| 2,695,247 | 11/1954 | Junge | 427/110 |
| 3,148,084 | 9/1964 | Hill et al. | 427/64 |
| 3,313,611 | 4/1967 | Dekeersmaecker | 65/65 A |
| 3,467,508 | 9/1969 | Loukes et al. | 65/30 |
| 3,586,541 | 6/1971 | Chamberlin | 136/206 |
| 3,652,246 | 3/1972 | Michelotti et al. | 65/181 |
| 3,656,926 | 4/1972 | Loukes et al. | 65/60 |
| 3,660,061 | 5/1972 | Donley et al. | 65/32 |

*Primary Examiner*—Arthur D. Kellogg
*Attorney, Agent, or Firm*—Bard & Groves

[57] ABSTRACT

A method of making low cost solar cells on a large scale basis by means of a continuous process of fabricating float glass and coating the float glass, in sequence, with tin oxide, cadmium sulphide, and copper sulphide, while the glass floats atop tanks of molten material in a furnace of proper temperature for each step of the process, the application of the coatings, in a preferred embodiment, being accomplished by depositing materials which form the coatings on contact with heated surfaces at such slow rates and, in the case of spray application, via drops of such uniformity that the float glass may (1) remain at uniform temperatures by virtue of the superior thermal conductivity of the molten material and retain those temperatures despite the abstraction of heat from the glass by evaporation of liquids and/or formation of crystalline layers, and (2) be substantially free of temperature gradients along the surface of the sheet glass.

13 Claims, 8 Drawing Figures

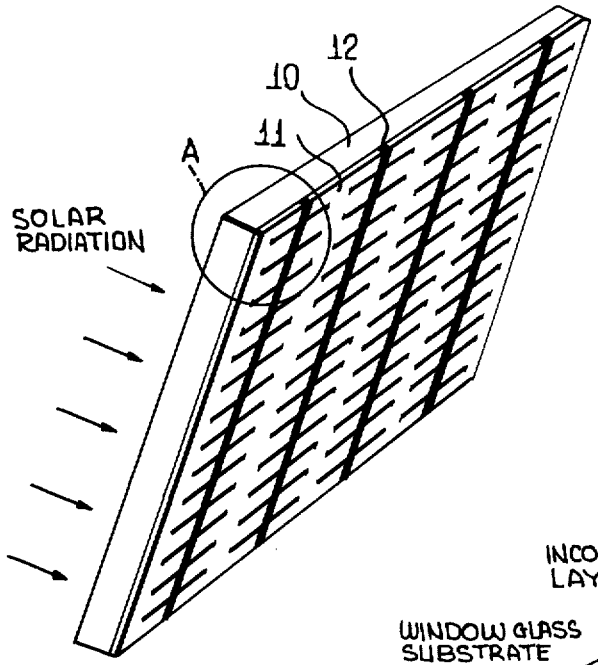
FIG. 1a
FIG. 1b
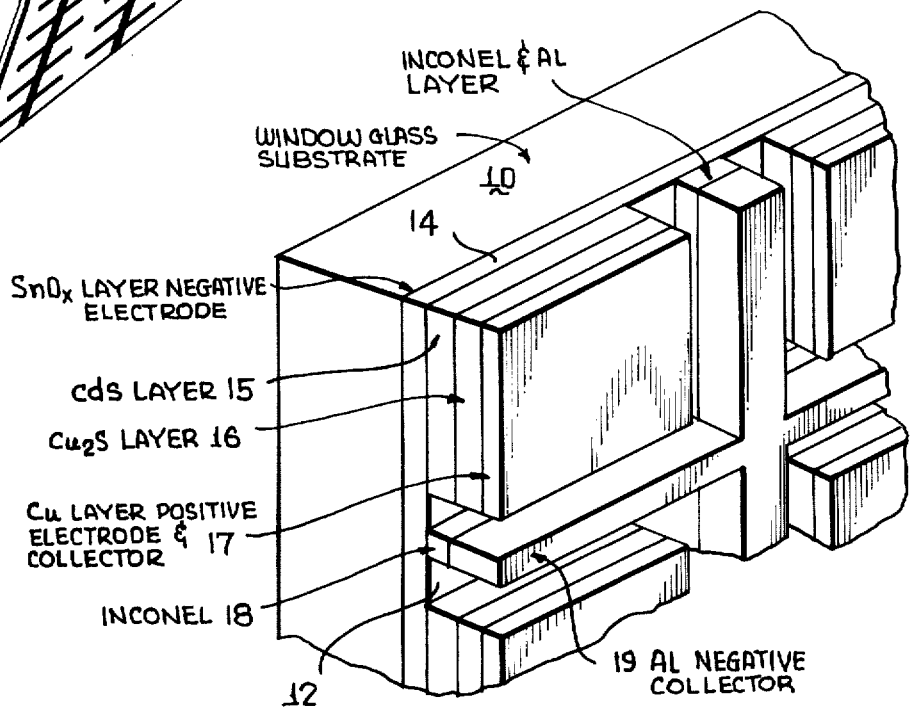
FIG. 1c
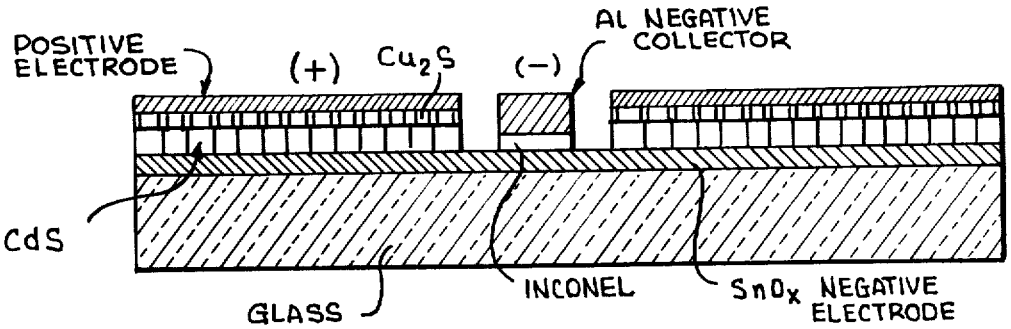

METHOD OF COATING A GLASS RIBBON ON A LIQUID FLOAT BATH

Matter enclosed in heavy brackets [ ] appears in the original patent but forms no part of this reissue specification; matter printed in italics indicates the additions made by reissue.

BACKGROUND

In the prior art, exemplified by Carlson patent, U.S. Pat. No. 2,820,841 (1958), solar cells employing cadmium sulphide are disclosed. These cells were fabricated by vacuum deposition of CdS on Nesa glass, in the form of a thin microcrystalline layer, and by depositing over the CdS layer a further layer of a material comprising monovalent cations of a metal selected from group 1B of the periodic table. The latter is preferably cuprous sulphide, $Cu_2S$. In accordance with our prior application for U.S. patent, Ser. No. 303,365, filed Nov. 3, 1972, CdS, $Cu_2S$ photo-voltaic or solar cells are produced by spraying suitable solutions, in atomized form, on conventional Nesa glass. Our process requires far less time than does vacuum deposition, but in addition produces cells which are superior in certain respects.

If solar cells are to be utilized for large scale production of power, areas of such cells are required in terms of square miles, and the cost of fabricating large areas of cells must be comparable with the cost of producing power by conventional systems, in terms of cost of providing a conventional system capable of producing the same power. On this basis, the economic feasibility of a large scale solar cell system depends in considerable part on the efficiency of the cells, i.e., the ratio of electrical output power to solar energy input, and this in turn is a function of the resistivity in ohms per square of the Nesa glass, which forms a negative electrode for the solar cells, and of its transmissivity to solar energy. One problem then is to provide low resistivity layers on glass, far lower than is the case for ordinary Nesa glass or than is known in the prior art, but which possesses high transmittivity to most components of solar radiant energy. We have produced such films on glass, as $SnO_x$, with resistivities of about 10 ohms per square. If the CdS layers have rather large specific resistivities, as for example in the range $10^3$ to $10^5$ ohm-cm, and if the $SnO_x$ layer and the CdS layer are transparent and clear, and not cloudy, cell efficiencies of 5 percent are then attained, and values as high as 8 percent are feasible. Output voltages of about 400. M.V. are regularly achieved. Radiation transmission through the $SnO_x$ is 92 percent in the spectral range of interest. Through the glass $SnO_x$ combination it is 78 percent.

The problem of producing high efficiency devices is not solely one of producing low resistance per square $SnO_x$ coatings. The latter can be accomplished by employing thick coatings of $SnO_x$, but in that case tranmissivity to light is impaired. There is involved a tradeoff, in terms of resistance per square, and transmissivity to desired radiation frequencies, and discrimination against infra-red rays.

A further problem relates to production of output electrodes. If copper is applied over the $Cu_2S$ layer, the low resistance of the copper renders the high resistance of the $Cu_2S$ of no operational significance. We have found that introducing oxygen into the $Cu_2S$ layer (hereinafter described), is beneficial. To accomplish this, the $Cu_2S$ layer can be sprayed to a required thickness, and then the spraying continued with the addition of oxygen in the form of $CuSO_4$ to form a layer superposed on the $Cu_2S$ layer. The latter acts to protect the $Cu_2S$ layer from atmospheric contamination, and may itself be protected by a further superposed layer of copper.

Proceeding as above described, it is estimated that power outputs of 128,000 K.W. (peak) at 5 percent efficiency per square mile of cells can be achieved.

The problem remains of producing the required square footage of cells, at reasonable cost and in a reasonable time. In accordance with the present invention, float glass manufacturing plants, which are capable of large scale production of glass sheet in a continuous process, are to be modified to include spraying or other types of deposition of the glass sheet, as it is made, with the requisite coatings, i.e., $SnO_x$, CdS and $Cu_2S$. The finished coated glass might then be cut into panels, perhaps $4 \times 8$ feet in size, which would be provided with electrodes, shipped to an installation site, and there mounted and interconnected to a power delivery and storage system.

There is a major advantage in so proceeding in that the glass sheet, as initially fabricated, is at a higher temperature then it is at any step of our process, and the steps of the process can be achieved at successively lower temperatures. It follows that our process can be achieved with minimum addition of heat during the coating process, as the latter proceeds. It is necessary to maintain the float tanks and furnaces at the temperatures requisite for the process, but it is not necessary to add heat to the glass itself, and in fact the molten material has heat added to it by the glass. This represents a large saving in energy, in comparison with processes in which cold glass panels are heated and then coated. It also represents a large saving in time to complete the process over that involved in commencing the process with cold panels of glass, and heating the glass to that required for coating with $SnO_x$ as the first step in the process of making large scale solar cells.

The approximate cost of a thermal electricity generating plant is at least $250 per kw. It is estimated that a solar cell installation produced by the method described herein and generating equivalent average power would cost approximately the same. However, the cost of energy storage is not included in the estimate.

Certain of the degrading factors which operate in the case of cells of the Carlson type have been found absent in the present cell. For example, infra red energy appears to degrade the Carlson type, i.e., vacuum deposited cells. Our sprayed cells, having low resistivity $SnO_x$ coatings, are exposed to radiation via the glass surface, and our low resistivity $SnO_x$ is found to discriminate against the infra red energy, i.e., for wavelengths longer than 1.5 $\mu$m. transmission falls off rapidly, but the coating is highly effective in passing frequencies above the infra red.

SUMMARY

A system for producing solar cells of large area by a continuous process in a modified float glass plant, in which glass is fabricated in a continuous sheet in a first float tank, and the sheet coated with the requisite layers of material to form solar cells in subsequent float tanks which are held at appropriate temperatures, each float tank being at a lower temperature than that preceding it in the process.

DESCRIPTION OF THE DRAWINGS

FIG. 1a is a view in perspective of a panel fabricated according to the invention;

FIG. 1b is a view of a portion of the panel of FIG. 1a, enlarged to show details;

FIG. 1c is a view in transverse section of a solar cell arranged according to one species of the invention;

DETAILED DESCRIPTION

Figure 2:
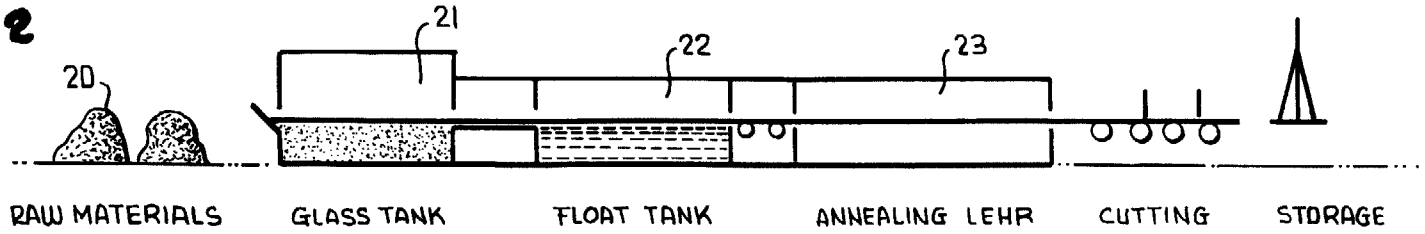
FIG. 2 is a view in side elevation of a float glass fabricating plant.
Figure 3:
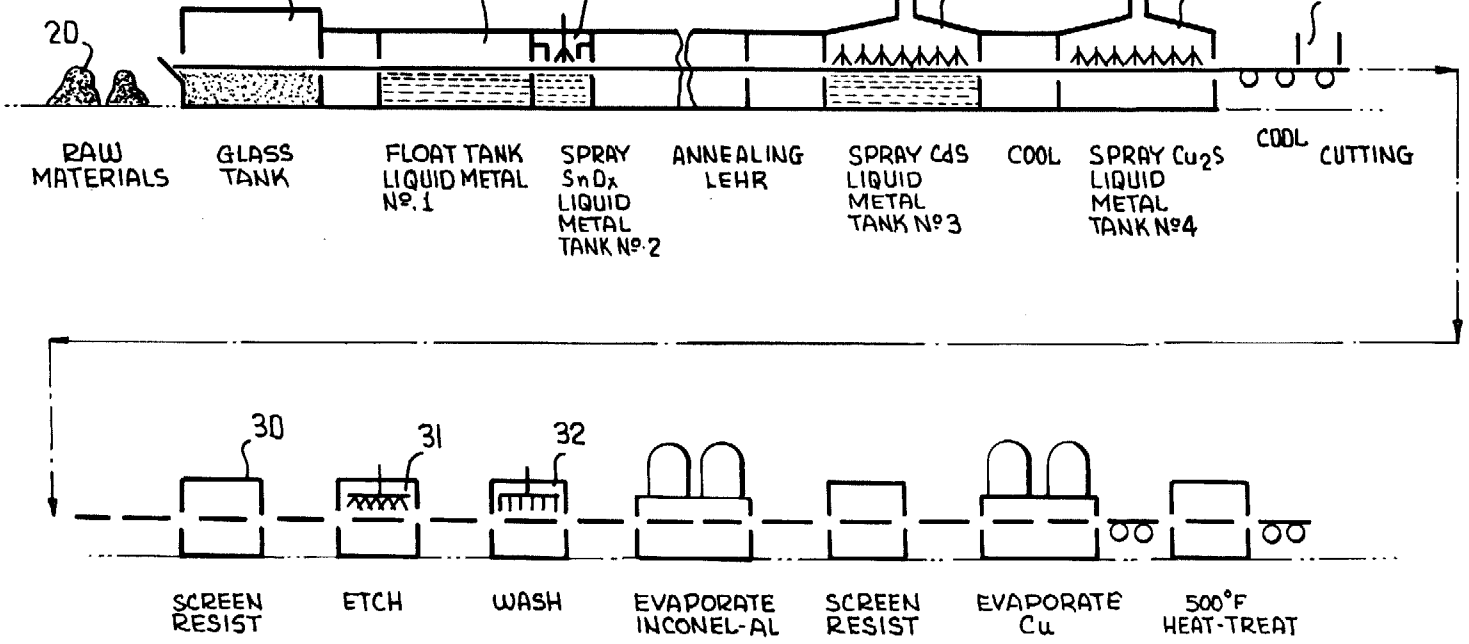
FIG. 3 is a view in side elevation of a float glass fabricating plant, modified for fabricating in a continuous process sheets of solar cells.

Referring to FIG. 1a of the accompanying drawings, 10 is a plate of double strength window glass, one-eighth inch thick, which serves as a substrate for the large scale mass-produced solar cells of the present invention. 11 generally represents coatings on the substrate of photovoltaic heterojunction, plus positive electrodes, while 10 and 12 represent negative electrodes. Reference is made to FIG. 1b, which illustrates an enlargement of that portion of FIG. 1a which is encircled in FIG. 1a. In FIG. 1b, 10 is the window glass substrate, on which has been deposited a layer 14 of $SnO_x$, constituting a negative electrode common to the entire substrate 10, and the x indicating that the precise composition is not known. On the layer 14 is deposited a layer 15 of crystalline CdS, which is about 2 microns thick. Superposed on the layer 15 is a layer 16 of $Cu_2S$, which after suitable heat treatment serves to form a heterojunction with the CdS. On the layer of $Cu_2S$ is superposed a layer 17 of copper, which serves as a positive terminal. The layers 15, 16, and 17 may be etched through to the $SnO_x$ layer 14, at intervals, to provide channels in which may be deposited buses of Inconel or chrome 18, and superposed aluminum 19, which provide negative terminals having multiple areas of contact with the $SnO_x$. The illustration of FIG. 1b represents one example of a solar cell fabricated according to the invention. An alternative form of cell is described in application for U.S. Pat. Ser. No. 303,365, filed Nov. 3, 1972, and entitled Photovoltaic Cell. That application employs the same heterojunction as the present invention, but assumes a panel of window glass coated with $SnO_x$ as a starting material. The present invention relates to continuous production of solar cells, commencing with the raw materials from which the glass is produced, in a continuous strip, about 10 feet wide.

The purpose of the present invention is to provide large area photovoltaic cells at sufficiently low cost to compete with thermal generating power plants, and which will cover many square miles of area, and to provide a practical method of fabricating these at the rate required, in square feet or square miles.

To obtain the panels at sufficiently low cost, it is necessary to manufacture on a very large scale. The usual process of producing glass panels is the float glass process (see FIG. 2). In a plant for carrying out the process, glass is manufactured in a continuous ribbon. The raw materials 20 are continuously fed to a furnace 21 and melted. The resulting liquid is poured into a bath of molten tin 22, where, by controlling the feed rate of materials and the velocity of the floating glass ribbon, its thickness can be controlled with $\pm 0.002$ inches. The glass is one-eighth inch thick (so-called double-strength window glass). Glass is fed as a continuous ribbon 10 feet wide from the liquid tin bath 22 to a cooling or annealing lehr 23, where it is cooled gradually, before being automatically cut to size. A typical annual output for such a plant would be 200 million square feet per year. A recently completed plant of this type, using two production lines of the type described above, has a planned capacity of 400 million square feet of glass annually. The plant cost is 50 million dollars. A plant of this type and size is to be converted according to the present invention, to the production of solar cells.

We, according to the present invention, interpose between the present liquid tin bath and cooling lehr, three or more liquid metal tank chambers, which may include closures to assure that the upper surface of the glass sheet is the same as the metal. The first of these, 25, will be used for spraying a solution of $SnCl_2$ and reactants and dopants to provide a low resistance transparent conducting $SnO_x$ layer. In the chamber it is necesary to maintain the top glass surface temperature equal to the tin temperature, though the impingement of the spray causes a momentary temperature decrease in the glass. The second chamber, 26, will be used to spray a CdS film, and the third, 27, in the cooling line at a much lower temperature, for spraying a $Cu_2S$ layer. After further cooling, the glass will be cut automatically to panel size by cutters 28. After cutting the glass into panels, these will then be coated with resist through a suitable screen, leaving exposed the areas required for channels in a pattern as illustrated in FIG. 1b. These areas are then etched out at station 31. In the etched channels 32, after washing at station 33, Inconel or chromium is evaporated onto the exposed glass in the required pattern, followed by an evaporation of Al to form the negative collector. Cu is then evaporated over the $Cu_2S$ layer not etched at station 31 to form the positive collector and the entire panel slowly heated to 500° C. and then slowly cooled. Upon cooling, the panel is ready for installation in a macro-system, involving square miles of such panels, interconnected among themselves and to suitable power transmission equipment.

In the alternative, evaporated zinc is used as the negative electrode, as in application Ser. No. 303,365. Upon heating, the zinc diffuses through the barrier (through the $Cu_2S$ into the CdS) and contacts the CdS layer underneath. In another alternative method, instead of etching channels through the CdS layer, zinc is evaporated followed by Cu through a mask onto the CdS layer.

The process of preparing solar cells by applying successive sprayed coating according to the present invention sufficiently decreases the time required for coating the required large areas that a continuous process becomes feasible. The time required for preparing cells by vacuum deposition of the requisite materials to form a large heterojunction is so long and the cost so great that large scale production becomes unfeasible. In addition, the coatings produced by spraying have characteristics superior in many respects to those produced by vacuum deposition.

Successful growth of crystal films, by spraying, consisting of crystallites from 2 μm to 12 μm taken in the dimension parallel to the substrate, has been achieved. See FIG. 6. In the vacuum deposition process the crystallites are generally 0.1 μm or less in the same dimension. A further characteristic of these films is their high specific resistivity, as grown, which varies between $10^3$ and $10^5$ ohm-cm. This is due to the fact that the crystals grown at the temperatures noted above tend to be stoichiometric and reject impurities. Crystallites grown by vacuum deposition generally have specific resistivities between 0.1 and 1 ohm-cm due to an excess of cadmium inherent in the vacuum evaporation process.

$Cu_2S$ layers have been grown on CdS films by spraying a solution of copper acetate and N,N, dimethylthiourea while the glass substrate is floating in a liquid metal bath, maintained at a temperature of approximately 300° F. However, since the $Cu_2S$ layer is extremely thin it can be deposited by evaporation.

The above processes have been done in air although it is desirable, at least in the growth of CdS, to use an atmosphere consisting of a mixture of $N_2$ and $H_2$ to prevent oxidation of the tin, which is expensive.

In order to make cells of 5 percent efficiency, it is necessary to use $SnO_x$ coated glass with a resistivity of $10^{15}$ ohms/square. Coating of such low resistivity is not commercially available, and the present invention is directed, in part, to production of such coatings.

We have succedded in depositing $SnO_x$ films of 10 ohms/square on soda line glass with a resulting radiation transmission (including the glass) of 78 percent. This result is made possible by continuously supplying heat to the glass while a solution containing $SnCl_2$ is being sprayed on the surface. Further, since the crystal structure of the $SnO_x$ controls the ensuing growth of the CdS film, which in turn controls the growth of the $Cu_2S$ film, it is necessary that the growth of each of these films be uniform to produce useful cells. It has been found that forming the $SnO_x$ layer while maintaining the surface being sprayed at one controlled temperature, and spraying sufficiently slowly that the temperature can be maintained uniform despite application of a liquid spray, enables productions of the requisite layers.

By coating the barrier with copper, to serve as a positive electrode, the cell resistance can be greatly lowered, as the sheet resistance of the $Cu_2S$ is then no longer important. In addition the metallic copper coating serves to protect the barrier from atmospheric contamination. An additional coating of aluminum over the copper may be employed to provide further protection for the copper itself. Both coatings can be evaporated in a continuous vacuum evaporation arrangement.

Figure 6:
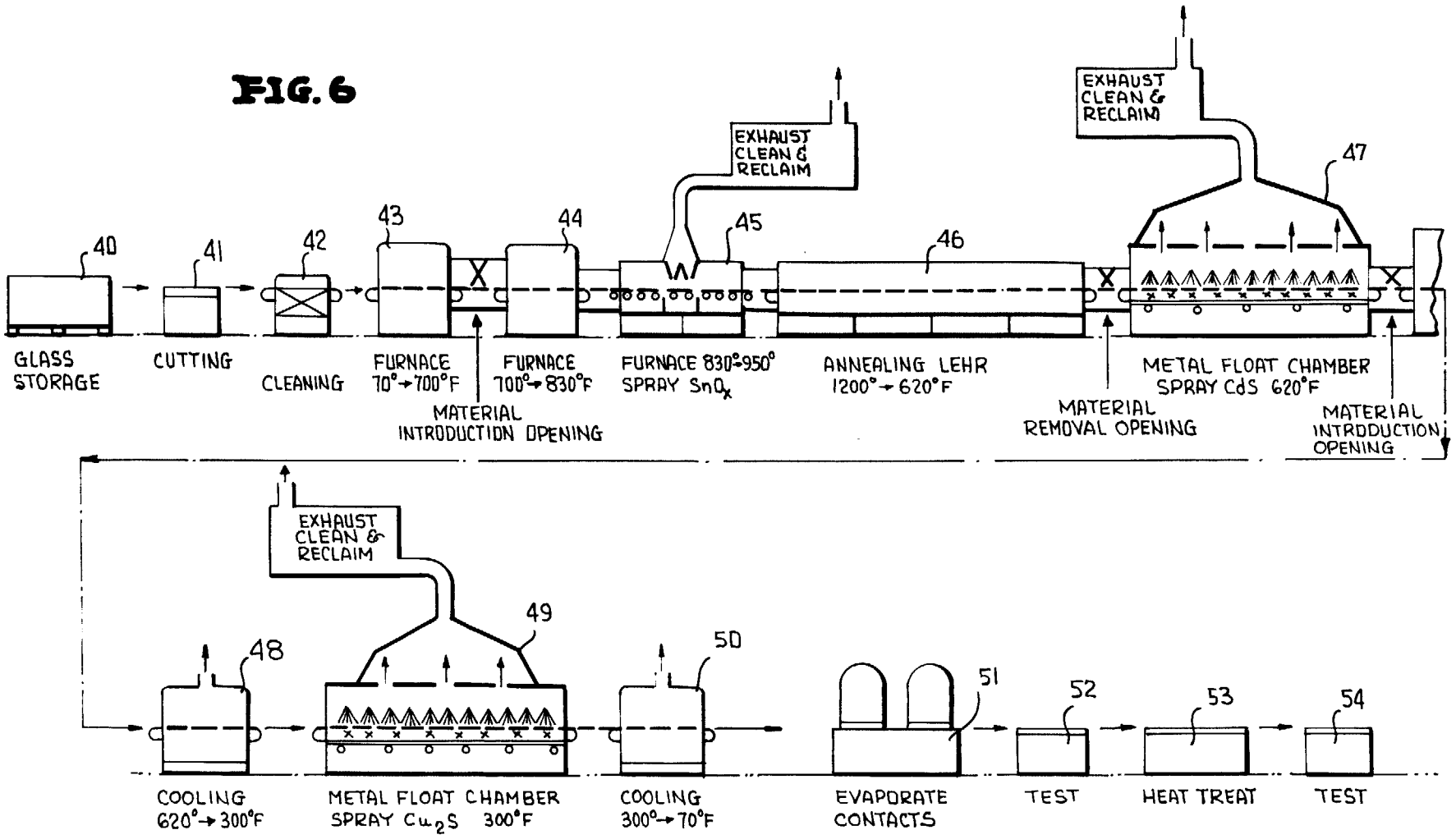
FIG. 6 is a view in side elevation of a pilot plant for continuously fabricating solar cells by the method of the invention.

The continuous process of the invention can be applied to pre-fabricated panels of window glass. Referring to FIG. 6 of the accompanying drawings, 40 represents storage panels of glass, which may not be of the desired dimensions. The panels provided may be precut to size at station 41, and cleaned at station 42, after which they are fed to a first elongated furnace 43, which raises the temperature of the panels from an assumed temperature of 70°, induced in the cleaning station 42, to 700° F., and thereafter in a second furnace 44, which raises the temperature of the panels to approximately 950° F. Following furnace 44 is a float station 45 for spraying the panel with $SnO_x$. The coated glass panel now proceeds through an annealing lehr 46, in which the temperature of the panel is slowly reduced to 700° F., so that the glass is annealed when it arrives at a float chamber 47. The float chamber 47 contains a vat of liquid tin, in which the panel floats, and the liquid tin is maintained at 620° F., so that the panel is maintained uniformly over its area at this temperature, while a water solution capable of providing CdS and other elements is slowly deposited by spraying. The spraying process is carried out by spraying in a moving pattern, covering a small area at a time, so that heat will not be abstracted at a substantial rate from the panel in response to evaporation of water or formation of CdS crystals, whereby the temperature of the panel can be maintained uniform. As the panel proceeds along the float chamber 47, successive small areas extending transversely of the panel are coated by moving the nozzles transiently of the panel as it moves, until the entire panel is completely coated to the required thickness. Many spray nozzles may be employed, and the surfaces continue to move during spraying of the glass until the required thickness of CdS crystals have been uniformly deposited. The length of the float chamber must be adequate to provide adequate spray times, giving consideration to the number of nozzles employed and the speed of travel of the glass.

While the CdS is coated on the panel, the float material for the latter is maintained at 620° F. Coating of a layer of $Cu_2S$ on the CdS layer must be carried out at 300° F. Accordingly, the panel is cooled to nearly 300° F., in chamber 48, and from the latter the panel is introduced into a metal float chamber which maintains the panel at 300° F. while it is being sprayed with a solution which produces $Cu_2S$, in a slow scanning process essentially like that described as taking place in chamber 47.

After the panel has been coated with $Cu_2S$ to the requisite thickness, the panel is slowly cooled to 70° F., in chamber 50, and from that chamber it proceeds to station 51, in which the requisite positive and negative contact areas are deposited, to station 52, where the completed panel is tested, to station 53, where it is slowly heated to 500° F. in a curing process, then slowly recooled, and thence to station 54, where it is finally tested prior to delivery.

In order that solar cells operate with the requisite efficiency, at least 5 percent, it is important that the process of applying the coating of $SnO_x$ result in a low resistance per square coating, which is not foggy. This implies (1) that most of the light available falls in the heterojunction, where it can be absorbed and converted to electrical power, and (2) that the electrical power generated not be lost in heating the $SnO_x$.

To improve the cell in the aspects noted in the previous paragraph, the soda lime (window) glass may be coated with $H_2SiF_6$ prior to coating with the $SnO_x$, the surface being at approximately 520° F. Under the influence of the acid, a silica film forms at the glass surface which prevents sodium from the glass diffusing to the surface of the glass. It is over this layer that the $SnO_x$ forms, and this layer protects the glass from the $SnO_x$ and maintains the glass clarity. The resultant coating of $SnO_x$ is of remarkably low electrical resistance per square, about 10 Ω/square while possessing good light transmission, whereas in the prior art the figure was usually about 55 Ω/square on soda lime glass. It is also found that the CdS layer is clearer and more uniform, if the glass is pretreated with acid before supply $SnO_x$If the acid treatment is omitted the CdS layer sometime tends to be cloudy, indicating that the polycrystalline layer of CdS is not composed of a uniform coating of microcrystals. This is not unexpected since the $SnO_x$ provides nuclei for formation of the CdS polycrystalline layer. Our process provides the requisite nuclei.

The described process for protecting the clarity of the $SnO_x$ is not, per se, an invention of the present applicants, but the discovery that CdS films formed over the $SnO_x$ coatings can be improved in this way is their discovery. It is known that the coating formed on glass by the present invention is not $SnO_2$, since the latter is an insulator. The high resistivity $SnO_x$ which was formed according to the prior art was probably deficient in oxygen and probably was infused with material deriving from the glass, or combined with some ingredients of the glass. The $SnO_x$ produced according to the present method is, though its precise composition is not known, a coating having unexpected and valuable properties. It is found that the improved coating is formed over a rather narrow range of temperatures, i.e., when the glass is coated on a molten metal bath at 830° F. while the acid is sprayed, and if temperature is maintained uniformly over its surface during the spraying of the compound which produces $SnO_x$, and throughout the volume of glass, and if the float of the glass is at 950° F. while the $SnO_x$ is being applied, superior results are achieved. The requirement of reasonable precision of temperature, and uniformity of temperature, implies a slow application of the acid and $SnO_x$ solutions, and requires nozzle movements providing spray over only a small part of the glass panel at ay one instant. In the absence of uniformity of temperature during spraying, the above described results are not achieved. For example, a 50° F. decrease in temperature may lead to an increased resistivity of 50° percent.

It is also found that the $SnO_x$ layer must be sprayed as $SnCl_2$ in methanol, and that water may not be used as a solvent, nor may $SnCl_4$ be employed as a source of $SnO_x$.

More specifically, the acid solution as it leaves the nozzle is at room temperature, when sprayed, and the spray solution is 1 part of $H_2SiF_6$ (30 percent) and 3 parts water. The spray rate per nozzle is 36 ml/min for 1 minute, at a nozzle pressure of 40 psi. The solution producing $SnO_x$ is sprayed at room temperature as it leaves the nozzle as a solution of the following proportions:

500 cc methanol
140 gm $SnCl_2$ (anhydrous)
1.4 gm phenylhydrozene hydrochloride
6.0 gm ammonium bifluoride ($NH_4FHF$).

The spray rate per nozzle is 36 ml/min for 105 seconds. The final thickness of the $SnO_x$ film is of the order of 0.4 micron. An exhaust system powerful enough to remove all gaseous by-products, as they are formed at the glass surface, is required.

In forming sheet glass, the initial melt is at about 3000° F., and this is provided to a float chamber of liquid tin. The glass cools as it passes along the tin bath so that at the end of the float chamber the glass is at about 1100° F. The glass sheet at 1100° F. is transferred to a separate float chamber, but is cooled, during the transfer to 830° F., and is promptly sprayed before it can heat up substantially, with the $H_2SiF_6$ solution. The bath to which it is transferred is at 950° F. and after the acid has been sprayed, the glass sheet heats up to that temperature and then is sprayed with the $SnCl_2$ solution, above specified, sufficiently slowly that the temperature of the glass is maintained, not on an average basis but on the basis that appreciable temperature gradients along the film, even between two adjacent droplets of the spray, are avoided. Any such gradients set up stresses which reduce the quality of the resultant film, i.e., uniformity, clarity, crystal size, thickness, transparency, resistivity. In order to maintain the temperature of the glass the bath is located in a chamber or enclosure so that the upper surface of the glass and the air above it is at the temperature of the bath.

After the $SnO_x$ layer has been formed to the required thickness the glass is cooled to about 700° F., slowly, following the recommended annealing curves for the glass, so that stresses will be relieved, and thereafter the glass sheet passes to a liquid tin bath in which the sheet is sprayed with a solution of $CdCl_2$ and N-N dimethylthiourea or thiourea in water, doped with $AlCl_3$ 0.001 to 0.002 molarity. Other chemical dopants may be used, the $AlCl_3$ being merely an example. The purpose of the dopant is to reduce the resistivity of the CdS crystals, in a controlled manner, which grow on the hot surface of the glass. Other suitable dopants are known and may be employed.

After the layer of CdS micro-crystals have been grown the sheet of glass may be cooled in a lehr to 300° F., where it enters a further tank of liquid, preferably consisting of an alloy of lead, tin and bismuth, and specifically 53 percent of bismuth, 32 percent of lead and 15 percent tin, which remains liquid at 300° F. While the sheet is passing through the bath the sheet of glass is coated with a solution of 0.0036 molarity copper acetate, 0.0018 molarity of N-N dimethylthiourea in de-ionized water. The mixture must be prepared just prior to spraying, at room temperature, and mixed for only 4 or 5 minutes prior to spraying. This is required because chemical reactions occur slowly during mixing, and these reactions are undesirable. Complete mixing is necessary, and the times specified enable complete mixing before the undesired chemical reactions have proceeded far. The spray forms a $Cu_2S$ film, and over the latter is sprayed 0.0018 molar solution of copper sulphate ($CuSO_4$) in de-ionized water. The $Cu_2S$ forming spray is arranged to produce a uniform film 1000 A thick over the area sprayed, and the spraying is conducted in a scanning pattern, covering small areas at a time, so that the sheet of glass will remain at uniform temperature despite the cooling effect of the spray. The second spray which forms a copper sulphate ($CuSO_4$) layer requires 15 minutes and leaves a layer about 500 A thick.

After the $CuSO_4$ has been deposited, the coated glass is cooled to room temperature, the entire surface is coated by vacuum deposition with copper to a thickness of 7000 A, and the copper coated with Al to provide protection against oxidation of the copper.

Negative electrodes may be formed in alternate ways. Channels may be etched down to the $SnO_x$, and the Inconel covered with Al negative buses installed. In the alternative, the negative electrode structure disclosed in Ser. No. 303,365 may be employed, or a Zn electrode may be deposited directly on the CdS layer prior to coating with $Cu_2S$. The Zn electrode may be coated with insulating lacquer, and the $Cu_2S$ layer may then be deposited as described above. Contact may be made with the Zn electrode, and since the latter diffuses to the $SnO_x$, contact is effectively made with the $SnO_x$.

It has been found, on the basis of extensive trial and error, i.e., empirically, that a low resistance $SnO_x$ layer, i.e., 10 Ω/square is formed so long as the glass is maintained at the proper uniform temperature, above specified, and water or water containing materials in the spray are avoided, chlorine is minimized, as by using $SnCl_2$ as a starting material instead of $SnCl_4$, for example, methanol is used as a solvent, and the phenylhydrazine hydrochloride and ammonium bifluoride are employed in nearly the quantities specified above. Considerable departure from the specified formula results in foggy glass and/or high electrical resistance, i.e., that formula is optimum. The formula provided does not assume that the glass must be treated with $H_2SIF_6$ prior to coating with $SnO_x$. However, if the $H_2SIF_6$ is not employed the CdS layer may be affected, in that it is cloudy instead of being clear, the implications of cloudiness having been hereinabove recited.

A precise formula employed for coating with CdS is, for nozzle spray, in the proportions:

5 liters de-ionized water
75 cc 1 Molar N N Dimethylthioureau solution
100 cc 1 Molar $CdCl_2.2\frac{1}{2}H_2O$
0.3 gm $AlCl_3.6H_2O$ (dopant).

The flow rate is 38 cc/minute, the nozzle pressure 20 psi, the temperature of the tin bath 620° F., the spraying time may be as long as 20 hours, depending on the desired thickness, and strong ultra violet light should be incident on the glass during spraying. Since glass in a window glass making plant travels at about 40 feet per minute, a very large number of simultaneously scanning nozzles is required to coat the glass in a continuous process, and the liquid bath in which the glass travels must be long, perhaps 4000 ft. long, to allow sufficient spray time for each square foot of the glass.

The total length of the spray chamber, and the total number of nozzles required, and the total spraying time can be radically reduced by employing electrostatic spraying in which a rapidly rotating bell-type electrostatic atomizer delivers the various solutions required in the coatings of the present invention. A suitable sprayer is that manufactued by Ransburg Electro-Coating Corp. and the operation of which is described in Scientific American for March, 1972, pages 52 and 53.

One of the drawbacks in spraying with a nozzle is that atomization is not precisely uniform. When a large drop and a small drop of spray reach the glass surface immediately adjacent one another they give rise to uneven cooling of the glass, i.e., to a temperature gradient. Glass is an excellent heat insulator, so that the underlying liquid metal is unable immediately to correct the temperature at the upper surface of the glass, with the result that the micro-crystals of diverse sizes are produced, in the case of CdS, reducing the efficiency of the cell area. In electrostatic spraying of the bell type, the sprayed material is broken up by means of a very rapidly rotating bell. The solution is fed to the center of the bell and streams out centrifugally to the edge, and is there thrown off. A large potential, 100 KV, exists between the bell and the object to be coated. In the resulting field, the sprayed materials forms streamers of remarkably uniform spacing. The streamers in turn break up into droplets, which are individually charged, and the droplets are remarkably uniform, as is required according to the present invention to minimize variations in crystal size.

An electrostatic spray can cover, in a given time, a much larger area than is possible with an air atomizing nozzle, and the rate of deposition at any given small area of the glass can be increased, because temperature gradients along the surface of the glass are radically reduced when the droplets are uniform and small. The values hereinabove provided for the coating of CdS have been found practical for nozzle spraying.

On a macroscopic scale, it is necessary to spray material on the glass at a linear rate, to avoid large scale temperature gradients, as distinguished from the microscopic gradients produced by adjacent droplets of different sizes. In the case of a travelling strip of material this can be accomplished by having the sprayers stationary linearly of this strip, but moving at a constant rate laterally while the material being sprayed moves longitudinally. In order to provide the required slow rates of deposition, many laterally traversing sprayers are required, spaced along the longitudinal dimension of the strip, and these might spray only when moving in one direction and not in return so that strip areas near the edges of the strip will not receive more spray material in a given time increment than do strip areas which are mid-strip, i.e., so that the spray thickness will be uniform over a very large area.

In open air the temperature of the surface of the glass strip is about 100° F. below the temperature of the required metal bath in which it floats, i.e., in absence of an enclosure or chamber above the glass. When the spray is received by the glass strip this causes a small transient drop of temperature where the spray is received, of about 20° F., but this transient drop of temperature is rapidly recovered as the spray moves to another area. These transient drops in temperature do not cause deterioration of the film. Microscopic temperature gradients caused by droplets of diverse sizes reaching the strip at immediately adjacent points are also transient, but appear to provide microcrystals of uneven sizes. Non-transient variations of temperature along the surface of the strip appear to introduce permanent strains in the crystal layer, or a non-uniformity of the crystal layer over the surface of the strip, and this is deleterious. To avoid these deleterious effects spraying must be accomplished very slowly, and the sprayed solutions maintained at constant droplet size, as nearly as feasible, to avoid any but transient macroscopic temperature gradients along the surface of the sprayed strip, and to minimize microscopic transient temperature gradients. The fact that the glass is floating in a metallic bath effects a rapid re-supply of heat to any part of the glass which is cooled by the spray.

A preferred embodiment of our invention (Ser. No. 303,365) requires the formation of CdS-$Cu_2S$ junction as above described, followed by provision of a layer of $CuSO_4$ and thereafter by a layer of Cu, the $CuSO_4$ providing oxygen to the underside of the layer of Cu to form a rectifying junction. An operative photovoltaic junction may also be implemented if the $Cu_2S$ layer is omitted, the $CuSO_4$ layer being laid down directly on the CdS microcrystals, and the Cu electrode being laid down directly on the $CuSO_4$. The $CuSO_4$ now, on being heated to about 500° F. for a sufficient time, provides oxygen for combination with the Cu electrode to form a rectifying electrode and sulphur to form $Cu_xS$ for combination with the CdS to form a photovoltaic heterojunction where x is close to but less than 2.

It has been found that the quality of polycrystals of a coating of CdS may be vastly improved if two flat coated surfaces of glass sheets are placed adjacent one another and the resultant sandwich heated to about 950° F. for about 10 minutes. The effect seems to involve the growth of large clumps of crystals. A more uniform crystal layer is formed by the transfer to crystalline material from areas where the deposit is thick on one surface to areas where the deposit is thin on another area, and generally to production of microcrystals of uniform size throughout both surfaces. The process is operative, so far as is known, by way of crystal regrowth because the glass surfaces are sufficiently flat that air is excluded from the films, allowing an atmosphere of CdS and $Cl_2$ to prevail during heating, the CdS and $Cl_2$ coming from the films. FIG. 6 is a photomicrograph of a CdS micro-crystal film regrown according to the method of the present invention, i.e., improved by placing two films in juxtaposition and heating.

Figure 4:
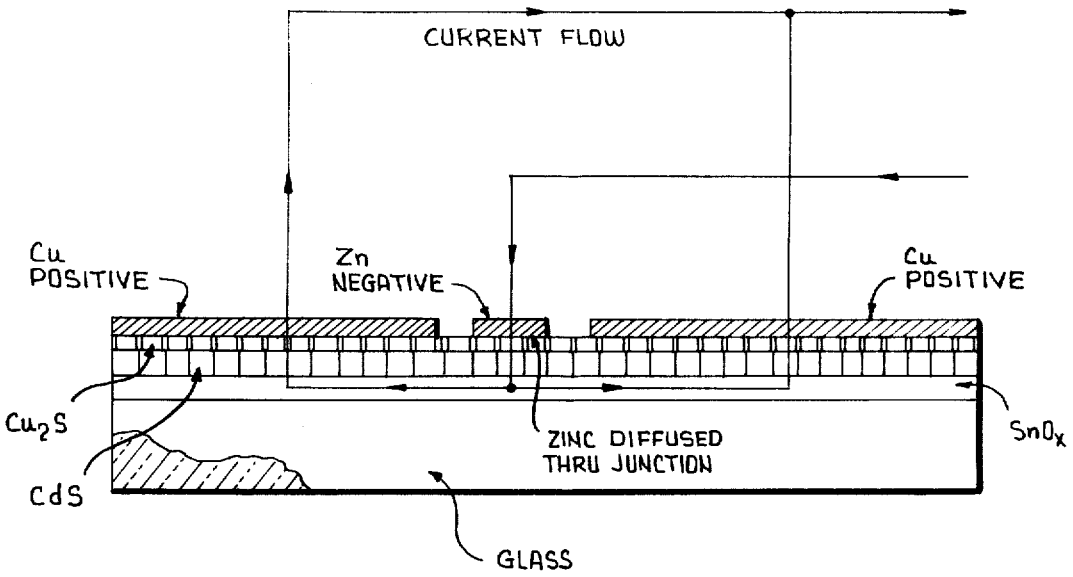
FIG. 4 is a view in section of a variant of the cell of FIG. 1c.
Figure 5:
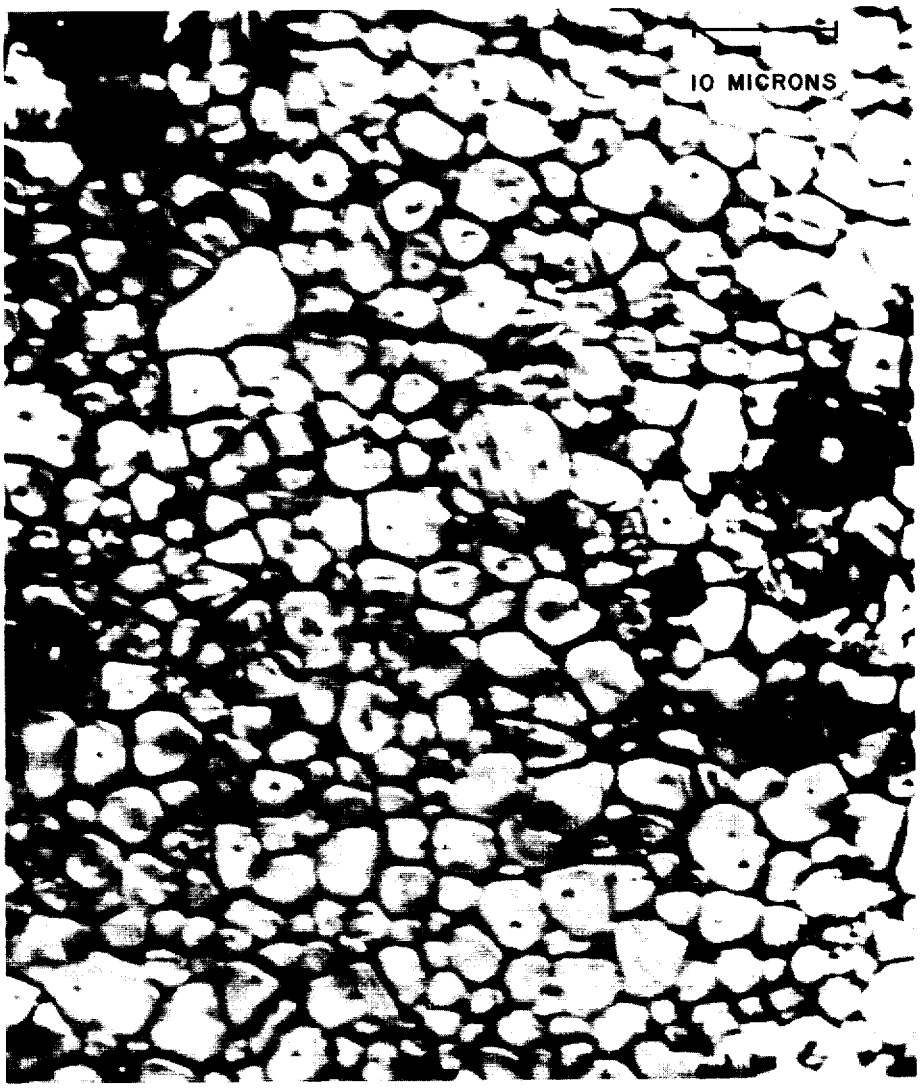
FIG. 5 is a photomicrograph of a poly-crystal film of CdS fabricated by the method of the invention.

In forming negative electrodes one may etch through the heterojunction, once it is formed, down to the $SnO_x$, through a resist mask, to form channels of the character illustrated in FIGS. 1b, 1c. The etchant may then be removed, and chromium or Inconel applied as buses to the $SnO_x$, and aluminum applied over the chromium or Inconel. Alternatively, zinc may be applied directly on the CdS before $Cu_2S$ is applied, and coated with lacquer to isolate the Zn from the $Cu_2S$ and subsequent coatings. The zinc can then form a positive electrode. Or the zinc may be applied to the $Cu_2S$ in stripes, and heated to drive the zinc down to the $SnO_x$, as illustrated in FIG. 4.

What is claimed:

1. A method of fabricating large scale solar cells, comprising moving a continuous strip of glass continuously in a path containing sequential heated liquid float tanks, and forming a $SnO_x$ film on said continuous strip of glass during traverse of said strip of a first of said float tanks, forming a film of CdS microcrystals on said $SnO_x$ film during traverse of said strip through a second of said float tanks, and forming a film of $Cu_2S$ over said CdS film during traverse of said strip through a third of said float tanks, wherein said float tanks contain liquid at temperatures suitable for formation of said films, and wherein said films are spray deposited at rates selected to enable said liquid in said float tanks to maintain the temperatures of the surfaces of said strip of glass constant during the forming of said films.

2. The combination according to claim 1, wherein said forming of said films is accomplished by spraying of solutions onto said strip, said solutions containing compounds selected to interact to form said films in the presence of heat, and said strip being maintained free of temperature gradients along the surface of the strip at the sprayed areas.

3. The combination according to claim 1, wherein said forming of said $SnO_x$ film is accomplished by spraying on said strip, while said liquid metal is maintained at 950° F. an atomized solution in the proportions of 500 cc methanol, 140 gm $SnCl_2$ (anhydrous), 1.4 gm phenylhydrozene hydrochloride, and 6.0 gm [ammonium bisulphide] *ammonium bifluoride* to a thickness of about 0.4 microns.

4. The combination according to claim 1, wherein said forming of said $SnO_x$ film is accomplished by spraying a methanol solution of $SnCl_2$ [in air] as uniform atomized droplets against said continuously moving strip of glass while said strip is maintained without macroscopic temperature gradients along the surface of the strip at about 950° F.

5. The combination according to claim 4, wherein said CdS film of microcrystals is formed by depositing an atomized spray on said film of $SnO_x$, said atomized spray solution having the proportion of 5 liters of deionized water, 75 cc 1 Molar [N N dimethylthiourea] *thiourea* solution, 100 cc 1 Molar $CdCl_2.2\frac{1}{2}H_2O$ solution, 0.3 gm $AlCl_3.6H_2O$ at a temperature of 620° F. while maintaining said strip and said film of $SnO_x$ free of macroscopic temperature gradients along the surface of the strip, said CdS film being about 1 to 2 microns thick.

6. The method according to claim 1, wherein said strip is [created] *coated* with an acid spray prior to coating of said $SnO_x$ film, said acid spray including $H_2SiF_6$, and the surface of said strip during said spray being at about 950° F.

7. A method of fabricating large scale photovoltaic cells, comprising floating a continuous strip of glass in a path containing sequential liquid float tanks, forming a $SnO_x$ film on said continuous strip of glass during traverse of said strip of a first of said float tanks, forming a film of CdS microcrystals on said $SnO_x$ film during traverse of said strip through a second of said float tanks, wherein said float tanks contain said liquid at temperatures suitable for formation of said films, and wherein said films are spray deposited at rates selected to enable said liquid in said float tanks to resupply sufficient heat to said glass to maintain the temperatures of the surface of said strip of glass constant during the forming of said films despite the cooling effect of said spray, and forming a film of $Cu_2S$ over said film of CdS microcrystals.

8. The method according to claim 7, wherein said forming of said films of $SnO_x$ and CdS is accomplished by spraying solutions onto said strip, said solutions containing compounds selected to interact to form said films.

9. The method according to claim 8, wherein said forming of said $SnO_x$ film is accomplished by intermittently spraying on said strip an atomized solution in methanol including $SnCl_2$ (anhydrous) and a fluorine salt, the intermittent spraying being at intervals sufficiently long to enable exposed surfaces of said glass to re-attain the temperature of the first of said float tanks despite cooling produced by said spraying.

10. The method according to claim 7, wherein said forming of said $SnO_x$ film is accomplished by spraying intermittently in air a methanol solution including $SnCl_2$ as atomized droplets against said strip with sufficient times between sprays to enable the temperature of the upper surface of said strip to be at constant temperature during said spraying.

11. The method according to claim 7, wherein said CdS film of microcrystals is formed by depositing an atomized spray on said film of $SnO_x$, said atomized spray including a water solution of [NN-DMthiourea] *thiourea*, $CdCl_2$, and $AlCl_3$.

12. The method according to claim 9, wherein said CdS film of microcrystals is formed by intermittently depositing atomized spray on said film of $SnO_x$, said atomized spray including a water solution of [NN-DMthiourea] *thiourea*, $CdCl_2$, and $AlCl_3$.

13. The method according to claim 10, wherein said CdS film of microcrystals is formed by depositing atomized spray on said film of $SnO_x$ in intermittent sprays, said atomized spray including a water solution of [NN-DMthiourea] *thiourea*, $CdCl_2$, and $AlCl_3$.

* * * * *